Aug. 5, 1969

F. R. BRAVENEC 3,460,158

RECORDER WITH CHART TENSIONING MEANS

Filed Oct. 25, 1967

Frank R. Bravenec
INVENTOR.

BY

ATTORNEY

Aug. 5, 1969  F. R. BRAVENEC  3,460,158
RECORDER WITH CHART TENSIONING MEANS
Filed Oct. 25, 1967  2 Sheets-Sheet 2

Frank R. Bravenec
INVENTOR.

BY Browning, Simms, Hyer
& Schmerhorn
ATTORNEYS

United States Patent Office 3,460,158
Patented Aug. 5, 1969

3,460,158
RECORDER WITH CHART TENSIONING MEANS
Frank Richard Bravenec, Houston, Tex., assignor to Bausch & Lomb Incorporated, Rochester, N.Y.
Filed Oct. 25, 1967, Ser. No. 678,012
Int. Cl. G01d 15/24
U.S. Cl. 346—136                    10 Claims

ABSTRACT OF THE DISCLOSURE

A recorder for recording information on a strip of recording medium having spaced perforations along the length thereof, is disclosed. The recorder includes a frame and a mechanism for driving and tensioning the medium between two sets of spaced apart sprockets mounted for rotation with respect to the frame. Means, such as a timing belt, connects the sprockets for rotation in unison and a motor is connected to drive one of the sprockets. A resilient tensioning means, such as a spring, is mounted on the recorder engageable with one surface of the medium between its engagement with the sprockets so that when the medium between its engagement with the sprockets so that when the medium is placed in engagement with the sprockets the tensioning means will deflect the medium between the sprockets and cause it to be placed in tension. The tensioning means yields sufficiently to allow the medium between the sprockets to vary in length from substantially the distance between the sprockets to greater lengths while maintaining tension on the medium and not causing tearing or mutilating thereof. A record marking means is mounted on the frame of the recorder for marking information on the medium in an area of interest.

---

Figure 1:
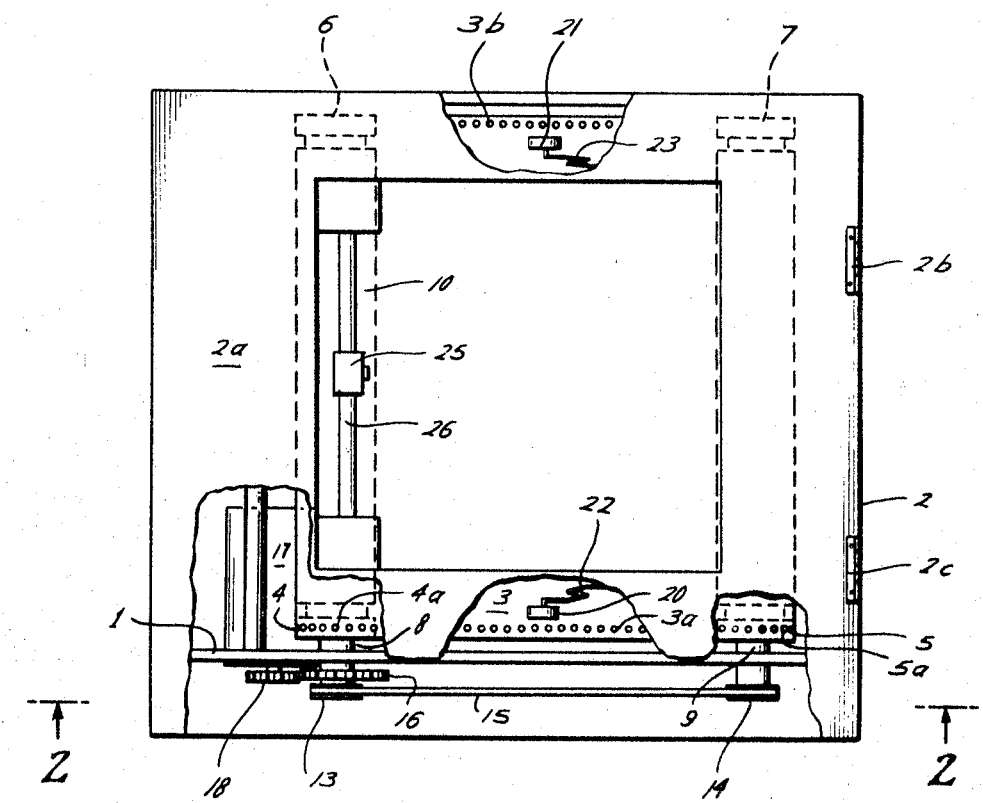

This invention relates to a recorder for recording information on a strip of recording medium with perforated sprocket holes along its length in combination with a mechanism for driving the medium and tensioning a portion of the medium in an area of interest where information is being recorded and to accurately position this area of interest with respect to the mechanism's drive sprocket or sprockets along, and in a plane perpendicular to, the direction of movement of the medium, even when the medium is being started, stopped, moved at high speeds, subjected to high accelerations, or is caused to expand or contract as a result of changes in temperature or humidity.

When a portion of perforated flexible strip is positioned by two sprockets or sets of sprockets, spaced some distance apart along the length of the strip, all sprockets must turn in unison or the strip will either buckle or tear. In unidirectional drive mechanisms for strip chart recorders, it is common to have one sprocket or set of sprockets drive the strip and the other sprocket or set of sprockets to maintain tension. The tensioning sprocket or sprockets are usually driven at a higher speed through a slip clutch. In some unidirectional recording apparatus such as a number of strip chart recorders, a single driven roller with a sprocket at one or both ends of the roller, and some form of drag device such as a slip clutch on the chart roll holder, is used and is sufficient to tension the chart paper and cause it to lie flat under the recorder pen. But such mechanisms are unsuitable bi-directional drives when the strip must be reversed while maintaining exact synchronism of the perforated strip, the drive sprocket or sprockets, and the driving means. For example, in a point plotting recorder, designed for reading out information sequentially from a multichannel analyzer, it is essential for channel identification to have each of the points plotted for each successive channel to fall in a predetermined position with respect to the grid lines printed on the recorder chart. It is also desirable to be able to reverse direction and plot information stored in each channel over a longer time period with exact coincidence of the plot for each channel number along the chart length. Precise synchronism of the drive and the chart is also essential when X–Y plots are made on a section of the chart with the chart being moved in proportion to an input variable X.

In the prior art, complex bi-directional drive mechanisms have been employed involving gear shifting mechanisms, clutches or the like to move the driving power from one set of sprockets to another set in order to reverse direction, with a torque motor or slip clutch acting on the non-driving sprockets to maintain tension. Such reversible drive mechanisms are not only costly and complex, but are unsuited to high dynamic performance and high accuracy applications such as in high speed X–Y recorders where the chart strip must move in response to an input variable X signal as the recording pen moves in response to an input variable Y signal. One prior art bi-directional recorder drive mechanism employs two rollers spaced apart along the length of the chart with sprockets fixed to the end of each roller and with a direct gear drive between the two rollers so that the latter rotate in unison. Such a device has two major disadvantages making it impractical for general usage. First, extreme precision is necessary in the gearing between the two rollers for a proper mesh of corresponding sprockets with the chart paper perforations greatly adding to the cost. Second, and more important, chart paper and most recording media expand and contract with temperature and humidity changes sufficiently to cause buckling or excess tension in the section between the two sets of sprockets in such a device. A satisfactory recorder drive mechanism must allow for expansion and contraction of the recording paper or other recording media used while maintaining tension of the chart in the area of the pen, particularly when pre-foiled Z or fan folded paper is used. Slip or drag clutches or contra-acting torque motors, common to the chart drive mechanism art, create tension by opposing the action of the driving motor and, therefore, reduce the dynamic accuracy and overall performance of the recording device in which they are used.

As indicated above, it is important to maintain the strip chart under tension, regardless of direction of movement. Various means have been suggested by the prior art, but these do not maintain synchronism when reversals occur, or they involve energy consuming and complex arrangements of clutch and gear mechanisms with severe dynamic performance limitations, or they require a precision coupling means between two sprockets and sprocket sets, and have no provision for controlling tension or preventing buckling when the strip chart expands or contracts from changes in temperature or humidity.

It is therefore an object of this invention to provide a recorder for recording information on a strip of recording medium in which the medium is supported by spaced apart driving and driven sprockets and tensioned therebetween by yieldable means applying a force to deflect the medium traversely of its path of movement, the tensioning of the medium insuring exact positioning of the medium with respect to the driving sprocket despite bi-directional movement or expansion or contraction of the medium so that a record being made on the medium between the yieldable means and the driving sprocket will always be properly positioned relative to a reference such as a grid line.

Another object is to provide such a recorder which can be reversed or used bi-directionally while maintaining exact synchronism under all conditions, including reversals, between the strip of recording medium in the section of interest, and the driving means causing rotation of the drive sprocket or sprockets, whether such driving means be a servo motor, a stepper motor or other source of power.

Figure 2:
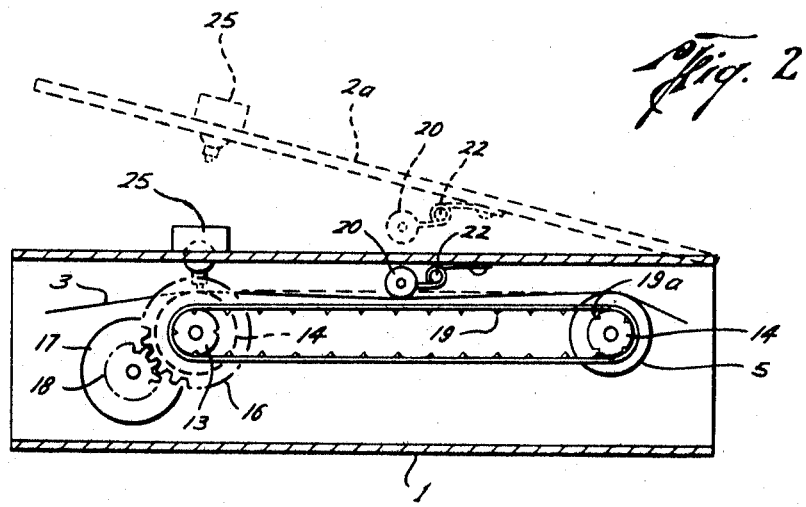
Figure 3:
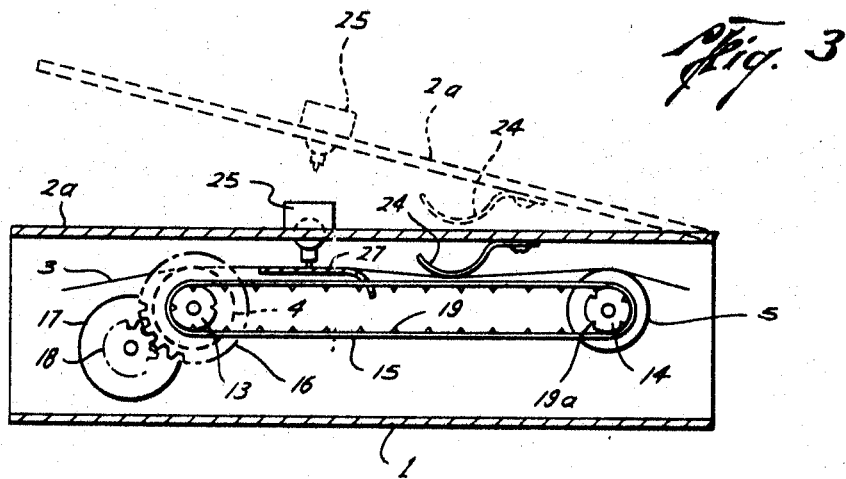

Other objects, advantages, and features of the invention will be apparent from a consideration of the specification, claims and appended drawings, wherein:

FIG. 1 is a top pictorial view of a recorder constituting a preferred embodiment of this invention with portions of its cover cut away to illustrate the driving connection between the sprockets and the position of the spring-loaded tensioning rollers on the margins of the recording medium;

FIG. 2 is a sectional view taken at 2—2 in FIG. 1 illustrating the deflection of a strip chart transverse to its path of movement by one form of a yieldable tensioning means in response to the closing of the cover; and FIG. 3 is a sectional view taken at 2—2 in FIG. 1 illustrating the deflection of a strip chart transverse to its path of movement by another form of the yieldable tensioning means in response to the closing of the cover.

Referring to the drawings, a preferred form of the recorder of this invention is shown as including a frame 1 which is adapted to be positioned inside of a recorder case 2 along with associated components, which can be conventional, to form the recorder. The case 2 also includes a cover 2a hinged thereon by the hinges 2b and 2c. A recording medium 3 is shown as a strip chart with perforations 3a disposed along the length of the chart and preferably along each margin of the chart. The chart is supported at longitudinally spaced portions thereof by two spaced apart sprockets 4 and 5 mounted for rotation with respect to the frame 1 and having projections or teeth 4a and 5a disposed to engage the perforations 3a in the chart for support and driving thereof. In the preferred embodiment shown, the strip chart 3 has an additional set of perforations 3b along its other longitudinal edge, and the additional sprockets 6 and 7 with projections or teeth 6a and 7a disposed to engage the perforations 3b in the chart laterally of the sprockets 4 and 5 for lateral support of the chart are provided.

Means are provided drivingly connecting sprockets 4 and 5, and in the preferred embodiment shown, also sprockets 6 and 7, for rotation in unison. As shown, this means preferably includes shafts 8 and 9, mounted for rotation on frame 1, rollers 10 and 11, mounted on shafts 8 and 9, respectively, pulleys 13 and 14, each connected to an end of shafts 8 and 9, a timing belt 15 drivingly connecting the pulleys 13 and 14, a gear 16 connected to shaft 8, a driving motor 17, and a gear 18 connecting motor 17 to shaft 8. The motor 17 is preferably reversible to allow for bi-directional movement of the chart 3. The sprockets 4 and 6 are each shown mounted on an end of the roller 10 and co-axially with them, and sprockets 5 and 7 are each shown mounted on an end of the roller 11 and coaxially therewith. Thus, the sprockets 4, 5, 6, and 7, shafts 8 and 9, rollers 10 and 11 and the pulleys 13 and 14 all rotate in unison.

In order to insure that this rotation will be in unison at all times, the timing belt 15 can include a plurality of equally spaced teeth 19 on its inner surface, as shown in FIGS. 2 and 3, for mating with notches 19a in each of the pulleys 13 and 14. Other devices, such as a gear train, can be used for this purpose.

When the chart 3 is supported by the sprockets 4, 5, 6 and 7 over the rollers 10 and 11, a yieldable force can be applied to deflect the chart transversely of its path of movement and tension it between the sprockets. Thus, a yieldable tensioning means is provided which is adapted to engage one surface of the chart between the portions supported by the sprockets 4 and 5, when the chart is supported thereon, to apply this force and so deflect the medium and tension it. As an example, this means could take the form of a spring loaded member mounted on the frame 1 to apply a yieldable force to the chart between the sprockets. The spring loaded member could be manually or automatically moved from engagement of the chart to allow loading and unloading. More specifically, in one preferred embodiment of this invention, as illustrated by FIGS. 1 and 2, this means includes rollers 20 and 21 yieldably mounted on the under surface of the cover 2a by the springs 22 and 23. The rollers engage the chart 3 between the portions thereof engaged by the sprockets and it is preferred that the engagement be along the margins of the chart to avoid smearing of any record made on the chart.

In FIG. 3 a less preferred form of the yieldable tensioning means is shown as a leaf spring 24 mounted on the underside of the cover 2a to engage the chart 3 between the sprockets 4 and 5. Again it is preferred that this spring engage the chart along a margin and two such springs may be provided, one to engage each margin.

A means is provided for moving the yieldable tensioning means into and out of engagement with the chart 3 while the latter is engaged by the sprockets 4, 5, 6 and 7.

FIGS. 2 and 3 illustrate preferred forms of this means which allows for engaging and disengaging the chart 3 with the yieldable tensioning means in response to the opening and closing of the cover 2a, by connecting the roller 20 or the spring 24 to the cover as previously described. This allows for positioning of the chart while it is not in tension and insures tensioning of the chart when the cover is closed.

A record marking means is also provided for marking information on the chart when supported by the sprockets. This means may take the form, for example, of a conventional pen, stylus, or character printing point plotter, and is mounted to traverse back and forth the chart as it moves along its path. In the preferred embodiment shown in FIGS. 1 and 2, this means is shown as a character printer 25 slidably mounted on the bar 26 to traverse the chart over the roller 10 in response to an input signal to be recorded, as well known by those skilled in the art. In this embodiment the roller 10 serves as a platen or backing means to allow printing on the chart 3, and absorbs the blow from the character printer 25 as it strikes the chart.

In the embodiment in FIG. 3, the platen 27 is shown as a plate with a flat surface disposed under the chart 3 and between the sprockets 4 and 5. The yieldable tensioning means, shown as the spring 24 in this embodiment, is shown between this plate and one of the sprockets to tension the medium therebetween. In this embodiment, the marking means 25 is mounted over the plate 27 to mark on a chart as it moves along its path of movement. It is to be understood that although FIG. 3 illustrates the tensioning means as the spring 24, to tension the chart over the plate 27, the roller 20 of the embodiment shown in FIGS. 1 and 2 could be used as well.

It will thus be seen that by connecting the driving motor means to directly drive one of the sprockets, which can be called the chart driving sprocket, and by spacing the chart marking means so that it is between the driving sprocket and the yieldable chart tensioning means, the chart in the area being marked will always be positioned with respect to the chart marking means by the driving sprocket, even upon reversal in direction of chart movement. For example, in FIGS. 1 and 2, sprockets 4 and 6 will be the driving sprockets and sprockets 5 and 6 the the "take-up" sprockets in the sense that sprockets 4 and 5 will always position the chart with respect to the marking means 25. If the chart medium should stretch due to temperature or humidity changes, the only result will be that rollers 20 and 21 will deflect the chart more to maintain it in tension between the two pairs of sprockets. The marking means will still be in the same relative longitudinal position with respect to each perforation in the chart medium.

Similarly, where a separate platen is used as shown in FIG. 3, the marking mechanism 25 is located between the drive sprocket 4 and the tensioning spring 24.

When the drive means connecting the driving and driven sprockets is of a type to have backlash, as in a gear train, any variation in the position of the driven sprocket relative to the driving sprocket due to the backlash upon a change in direction will merely result in a greater or lesser deflection of the chart medium by the tensioning means. It will not cause any variation in the position of the record being made with respect to reference lines such as grid lines. Moreover, in certain cases it may be possible to make the force applied by the tensioning means sufficiently great that backlash movement is prevented from having any effect upon the relative positions of the two sprockets.

The invention having been described, what is claimed is:

1. In a recorder for recording information on a strip of recording medium with at least one set of spaced perforations along the length thereof, the combination therewith of a mechanism for driving and tensioning such medium comprising: a frame; first and second spaced apart sprockets mounted for rotation with respect to said frame and having projections disposed to engage said perforations at longitudinally spaced portions of such medium for support and driving thereof; means drivingly connecting said sprockets for rotation in unison; motor means for driving said one sprocket; resilient tensioning means mounted on said recorder and engageable with one surface of such medium between said spaced portions thereof when the medium is placed in engagement with said sprockets to tend to deflect the medium so as to cause the length thereof between the sprockets to be placed in tension, said resilient means being sufficiently yieldable from a point on a straight line between points of engagement of said medium with said sprockets to a point laterally from said line to provide varying deflections to maintain the medium in tension despite variations in the length thereof from substantially the distance between said points of engagement to greater length; and record marking means mounted on said frame for marking information on such medium.

2. The recorder of claim 1 wherein means are provided for moving said yieldable tensioning means into and out of engagement with the medium while the latter is engaged by said sprockets whereby the medium can be moved into an removed from its position on said sprockets while untensioned.

3. The recorder of claim 2 wherein said means for moving said yieldable tensioning means is a cover carried by the recorder and upon being moved to the closed position, causing said yieldable tensioning means to tension the recording medium.

4. The recorder of claim 1 wherein said yieldable means is a spring having a flat portion engageable with the medium.

5. The recorder of claim 4 wherein said spring is disposed so that said flat portion engages a margin of the medium so as to avoid smearing any record made on the medium.

6. The recorder of claim 1 wherein a platen is provided to support said medium by engaging a surface thereof longitudinally spaced along the medium from said location engageable by the yieldable tensioning means toward said first sprocket, said record marking mechanism being positioned on the side of said medium opposite said platen.

7. The recorder of claim 6 wherein said platen is a roller disposed co-axially with one of said sprockets.

8. The recorder of claim 6 wherein said platen is a plate spaced between said sprockets.

9. The recorder of claim 1 wherein said yieldable tensioning means is a spring having a roller engageable with the medium.

10. The recorder of claim 9 wherein said spring is disposed so that said roller engages a margin of the medium so as to avoid smearing the record made on the medium.

References Cited

UNITED STATES PATENTS

| | | | |
|---|---|---|---|
| 2,037,452 | 4/1936 | Boecking | 226—59 |
| 2,446,400 | 8/1948 | Woolley | 346—136 X |
| 2,578,803 | 12/1951 | Holmberg et al. | 346—136 X |
| 3,051,408 | 8/1962 | Finch | 346—145 X |
| 3,285,484 | 11/1966 | Johnson | 226—85 |

RICHARD B. WILKINSON, Primary Examiner

JOSEPH W. HARTARY, Assistant Examiner

U.S. Cl. X.R.

226—85, 195